(12) United States Patent
Staver et al.

(10) Patent No.: US 6,393,123 B1
(45) Date of Patent: May 21, 2002

(54) METHOD AND MODEM CIRCUIT FOR DETERMINING CONNECTION STATUS OF A PHONE LINE

(75) Inventors: Daniel A. Staver, Scotia; Paul A. Frank, Albany, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/547,469

(22) Filed: Apr. 12, 2000

(51) Int. Cl.[7] .............................. H04M 1/00; H04M 3/00
(52) U.S. Cl. ..................... 379/377; 379/378; 379/379; 379/380; 379/381; 379/382; 379/383
(58) Field of Search ................................. 379/402, 382, 379/67.1, 100.16, 93.09, 385, 400, 88.07, 195, 377, 378–386

(56) References Cited

U.S. PATENT DOCUMENTS

| 4,392,023 A | | 7/1983 | Sears |
|---|---|---|---|
| 4,500,754 A | | 2/1985 | Mackey |
| 4,514,595 A | * | 4/1985 | Rosenbaum et al. ........ 379/385 |
| 4,958,371 A | | 9/1990 | Damoci et al. |
| 5,140,631 A | | 8/1992 | Stahl |
| 5,392,334 A | * | 2/1995 | O'Mahony ................. 379/67.1 |
| 5,506,891 A | | 4/1996 | Brown et al. |

OTHER PUBLICATIONS

Jung, Walter G., (Editor), IC Op–Amp Cookbook, 1997, Prentice hall, PTR, New Jersey, Third edition, Chapter 4, pp. 200–223.*
Jackson, Horace G., Reference Data for Engineers; Chapter 19 (Transistor Circuits), 1985, Howard W. SAMs & Company, Indiana, USA, Seventh Edition, pp. 19–1 to 19–31.*

* cited by examiner

Primary Examiner—Forester W. Isen
Assistant Examiner—Ramnandan Singh
(74) Attorney, Agent, or Firm—Jill Breedlove; Beusse Brownlee Bowdoin & Wolter PA; Enrique J. Mora

(57) ABSTRACT

A circuit for determining connection status of a phone line shared by multiple telecommunications devices, such as modems and phones, is provided. The phone line includes respective tip and ring lines. The circuit comprises a first transistor stage coupled to receive a signal indicative of a voltage difference between the respective tip and ring lines. The first transistor stage is configured to supply an output signal having a predetermined time response. The circuit further comprises a second transistor stage coupled to the first transistor stage and configured to supply an output signal having a slow time response relative to the output signal from the first transistor stage.

21 Claims, 2 Drawing Sheets

METHOD AND MODEM CIRCUIT FOR DETERMINING CONNECTION STATUS OF A PHONE LINE

This application is related to U.S. patent application Ser. No. 09/546,849, entitled "Method And Modem Circuit Using A Dither Signal For Determining Connection Status Of A Phone Line" by Daniel A. Staver, et al, and assigned to the assignee of the present invention and herein incorporated by reference.

BACKGROUND OF THE INVENTION

This invention is generally related to the field of telecommunications devices, such as telephones, facsimile machines, computer modems, automatic alarm or diagnostic dialers, etc., which operate over telephone lines. More particularly, this invention is related to a circuit and method that may be used in such devices for determining the connection status of a telephone line shared by the device, e.g., determining whether the telephone line is On-Hook or Off-Hook.

It is typical that a residential or business user may want to connect more than one telecommunication device in one common telephone line. When one of the devices has an auto-dialing function, such as in a facsimile machine or a modem, conflicts may arise if the telephone line is in use (Off-Hook) when the automatic device attempts to dial a number. The presence of the automatic devices should not impact on normal usage of the telephone line for voice communications. Therefore, the devices should have some means of determining when the telephone line is being used for normal voice communication on one of the local telephones. Further, the devices should not attempt to use the telephone line if it can be determined that the line is in use, and such determination should be made without interfering with existing communications. Similarly, when the automatic device is using the telephone line, it should abandon the line if one of the local telephones goes Off-Hook. Further, the automatic device should not prevent normal usage of the telephone line in an emergency situation. For the various reasons given above, the devices should have circuitry for detecting whether the telephone line is Off-Hook or On-Hook during various operational modes, such as before dialing is attempted, or for determining whether a present communication should be temporarily discontinued.

As will be appreciated by those skilled in the art, when a telephone line is in On-Hook condition, i.e., when the telephone handset is resting on its cradle, there is virtually no current flow, and the line voltage is relatively high, typically 50 V DC. Conversely, when a telephone line is in Off-Hook condition, the phone circuits complete a circuit loop and there may be current consumption of, for example, 10–50 mA DC, and the line voltage is low, about 1–10 V DC. The line state may thus be detected either by sensing the current in the line, or by sensing the line voltage.

Generally such telecommunication devices include a line interface between the telephone line and their data circuits and that line interface is chosen to provide a suitable impedance match between the telephone line and the data circuits in the device. Further, such line interface is required to galvanically isolate the data circuits from the telephone line. The galvanic isolation is typically achieved by the use of transformers, opto-couplers, relays, or by a combination of such components. Thus, the data circuits may be electrically isolated from the telephone line while the signal information is electromagnetically or optically coupled therebetween depending, for example, on whether a transformer, a capacitor, or an opto-coupler is respectively used to provide the galvanic isolation.

Although determining whether a respective device is loading the telephone line is conceptually relatively straight forward, such as could be made by tracking DC voltage measurements between respective ring and tip lines of the telephone line. Unfortunately, in practice such determination is not so simple. One problem is that the characteristics of the telephone line itself can greatly change, both from site to site and at a single site over a period of time. Further, as suggested above, when the device is using the telephone line it should be able to detect when one of the local telephones goes off hook. In this case, making an accurate determination becomes problematic since there may be great variation in the line loading created by different types of telephones. Some prior art line connection detectors, have used opto-coupler devices for sensing line current variation. Unfortunately, such detectors are prone to errors since they are limited to operate in a relatively narrow range where they exhibit linear characteristics. Other prior art devices have required use of analog-to-digital converters which add to the cost and complexity of the detector.

From the foregoing discussion it will be appreciated that it is desirable to provide a circuit and method that may be used by the telecommunication devices for determining the connection status of the telephone line that has the following characteristics: maintains substantial isolation from the line, responds promptly and accurately even in the presence of noise and conversely does not generate noise which can interfere with data/and or voice transmission, requires no interaction between local and remote locations to function, is impervious to the non-ideal characteristics of real circuit components, such as the presence of offset voltages, bias currents, etc., is inexpensive and reliable.

BRIEF SUMMARY OF THE INVENTION

Generally, the present invention fulfills the foregoing needs by providing a circuit for determining connection status of a phone line including respective tip and ring lines. The circuit comprises a first transistor stage coupled to receive a signal indicative of a voltage difference between the respective tip and ring lines. The first transistor stage is configured to supply an output signal having a predetermined time response. The circuit further comprises a second transistor stage coupled to the first transistor stage and configured to supply an output signal having a slow time response relative to the output signal from the first transistor stage.

The present invention further fulfills the foregoing needs by providing a telecommunications device having a circuit for determining connection status of a phone line shared by that device with a phone. The phone line includes respective tip and ring lines. The device comprises a controller coupled to receive from the circuit a signal indicative of the connection status of the phone line and having means for initiating or interrupting a respective communication based on the indicated line connection status, and wherein the circuit in turn comprises a controller coupled to receive from the circuit a signal indicative of the connection status of the phone line and having means for initiating or interrupting a respective communication based on the indicated line connection status, and wherein the circuit in tun1 comprises a first transistor stage coupled to receive a signal indicative of a voltage difference between the respective tip and ring lines. The first transistor stage is configured to supply an output signal having a predetermined time response. A second transistor stage is coupled to the first transistor stage and is configured to supply an output signal having a slow time response relative to the output signal from the first transistor stage.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
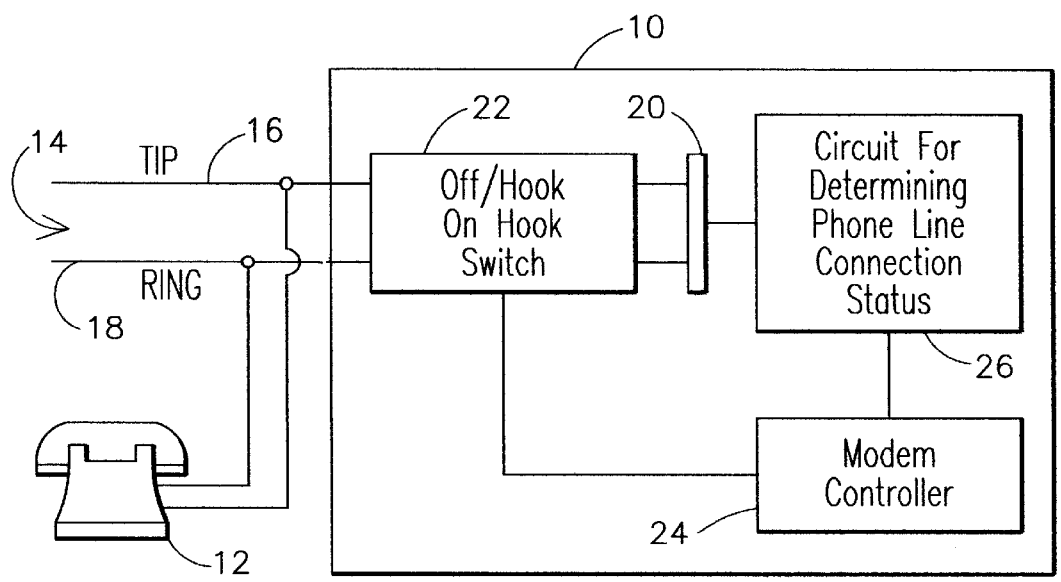
FIG. 1 is a schematic diagram of a telecommunications device, such as a modem, that may benefit from the techniques of the present invention. The modem is shown as sharing a common line with a telephone and uses the circuit of the present invention for determining the connection status of the line.

FIG. 1 shows an exemplary modem 10 that may benefit from the techniques of the present invention. Modem 10 and a telephone 12 are connected to a common telephone line 14, made up of respective tip and ring lines 16 and 18. A galvanic isolation device, such as an optocoupler 20, is connected to lines 16 and 18 via contacts in a Off hook/On Hook relay switch 22. For example, telephone line 14 may be connected to the modem circuitry when the switch 22 is in a conductive state, and disconnected from the modem circuitry when the switch 22 is a nonconductive state. A modem controller 24 may include a microprocessor with associated memory for control of the modem, and, in particular, control of the respective state of switch 22, at least in part due to an output signal from a circuit 26 that embodies the techniques of the present invention for determining the connection status of the telephone line, i.e., tip and ring lines 16 and 18.

By way of example, when the modem 10 is activated for dialing, the modem controller 24 may initially check if telephone line 14 is available, by polling circuit 26 for determining phone line connection status. If line 14 is in On-Hook condition, modem controller 24 energizes switch 22 into its conductive state, and automatic dialing starts. Conversely, if the telephone line 14 is in use, modem 10 waits for the line to become available before energizing switch 22 into a conducting state and start dialing. Conversely, if the modem has established communication and circuit 26 determines that telephone 12 is Off-Hook, then modem controller 24 could temporarily suspend communications and command switch 22 into a non-conducting state and thus free line 14 to the telephone user.

Figure 2:
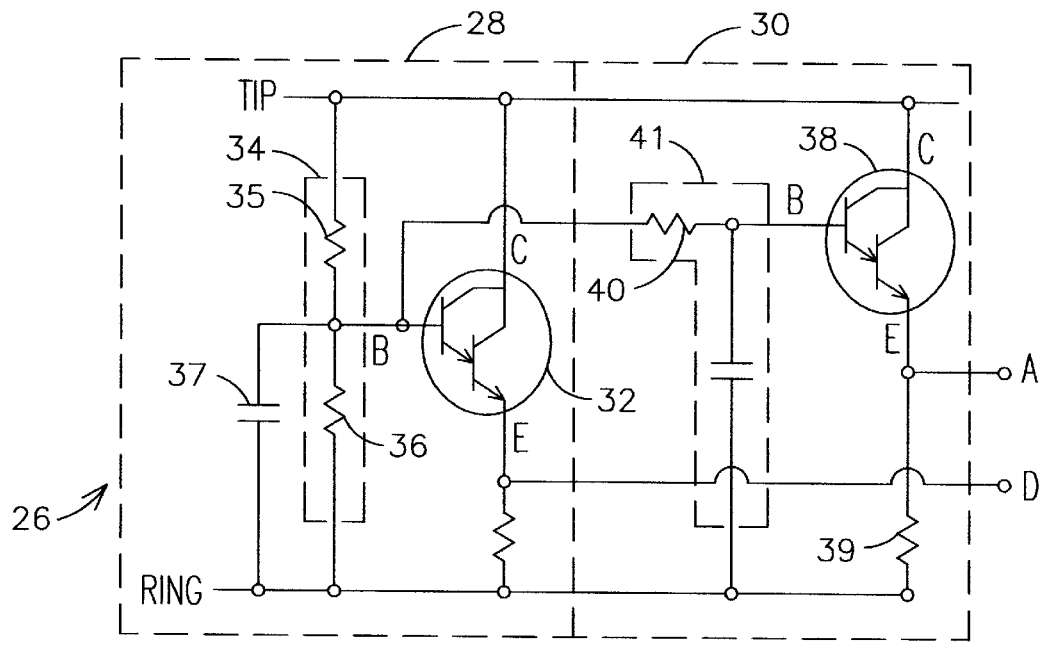
FIG. 2 illustrates further details regarding the circuit of the present invention, such as first and second transistor stages for generating respective output signals indicative of a voltage difference across the tip and ring lines and having a different time response relative to one another.

FIG. 2 shows further details in connection with circuit 26 for determining connection status of a phone line including respective tip and ring lines 16 and 18. As shown in FIG. 2, circuit 26 is made up of a first transistor stage 28 coupled to receive a signal indicative of a voltage difference across the respective tip and ring lines. First transistor stage 28 is arranged to supply an output signal (e.g., the output signal supplied through terminal D) having a predetermined time response, e.g., a relatively fast time response. Circuit 26 is further made up of a second transistor stage 30 which is coupled to the first transistor stage and is arranged to supply an output signal (e.g., the output signal supplied through terminal A) that has a slow time response relative to the output signal from the first transistor stage. As shown in FIG. 2, first transistor stage 28 includes a respective transistor 32 that has respective base (B), collector (C), and emitter (E) terminals and wherein the collector terminal is directly coupled to the tip line. The emitter terminal is coupled to the ring line through an emitter resistor 33 and the base terminal is coupled to receive the voltage difference across the respective tip and ring lines. As further shown in FIG. 2, first transistor stage 28 has a voltage divider network 34, made up of resistors 35 and 36, for receiving the voltage difference across the respective tip and ring lines. Voltage divider network 34 includes a bypass capacitor 37 for attenuating AC signal information and preventing passage of such AC signals into the base terminal of the first transistor stage. As shown in FIG. 2, the emitter terminal supplies the output signal from the first transistor stage through terminal D.

FIG. 2 farther shows that second transistor stage 30 comprises a respective transistor 38 having respective base (B), collector (C) and emitter (E) terminals and wherein the collector terminal is directly coupled to the tip line. The emitter terminal is coupled to the ring line through a respective emitter resistor 39 and the base terminal is coupled to the base terminal of first transistor stage 28 through a feed-forward resistor 40 to receive the voltage difference signal across the respective tip and ring lines. Second transistor stage 30 further comprises a lag network 41 coupled to impart a predetermined lag to the voltage different signal being fed into the base terminal of the second transistor stage through terminal B. It will be appreciated from FIG. 2, that the emitter terminal of transistor 38 supplies the output signal (A) from the second transistor stage. It will be further appreciated that the specific values of the circuit components shown in FIG. 2 may be selected using basic principles of operation of electronic circuits that are well-understood to one of ordinary skill in the art. For readers that desire further background information regarding electronic circuits reference is made to textbook titled "Electronic Circuits: Discrete and Integrated", by Donald L. Schilling and Charles Belove, published by McGraw-Hill Book Company, which textbook is herein incorporated by reference.

Figure 3C:
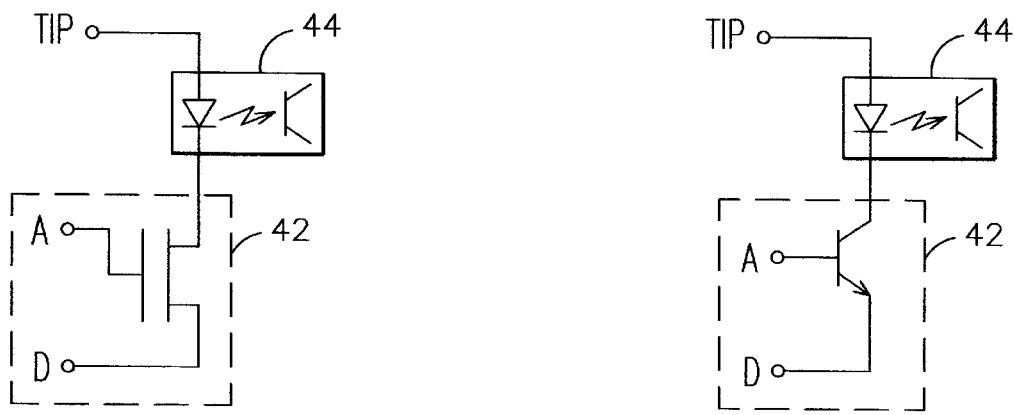
FIG. 3, made up of FIGS. 3A–3C, illustrates respective exemplary embodiments of a third transistor stage coupled to the transistor stages of FIG. 2 for determining the connection status of the phone line.
Figure 3C:
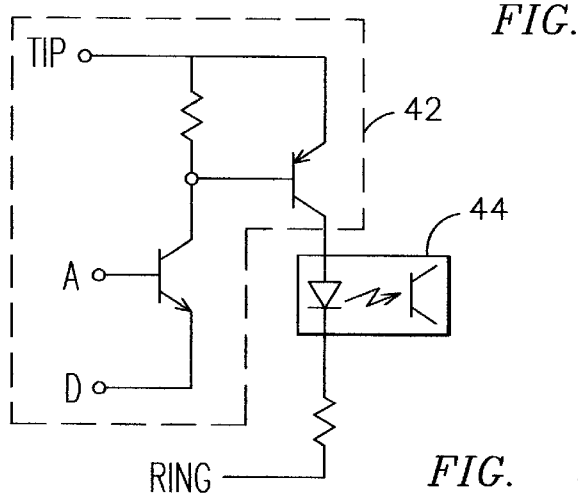

FIG. 3, that is respectively made up of FIGS. 3A, 3B and 3C, shows a third transistor stage 42 responsive to the respective output signals supplied through terminals A and D of the first and second transistor stages to generate a pulse signal indicative of the connection status of the phone line. As shown in FIG. 3, circuit 26 further comprises an opto-coupler device 40 coupled to receive the pulse signal from the third transistor stage. The level of the pulse signal is selected to drive the opto-coupler 44 in a saturation mode of operation upon detection of a respective change in the connection status of the phone line. The respective transistor stages 42 shown in FIG. 3 may be chosen, as will be appreciated by those of ordinary skill in the art, depending on a desired threshold voltage for driving opto-coupler 44 into saturation, or a desired level of noise immunity, or circuit sensitivity. For example, transistor stage 42, as shown in FIG. 3A may comprise a field-effect transistor, while transistor stage 42 in FIG. 3B may comprise a bipolar-junction transistor, which may be desirable in environments where electrical noise may be relatively high. For applications where a higher level of sensitivity may be desired, then transistor stage 42 may comprise a tandem combination of transistors as illustrated in FIG. 3C.

Figure 4A:
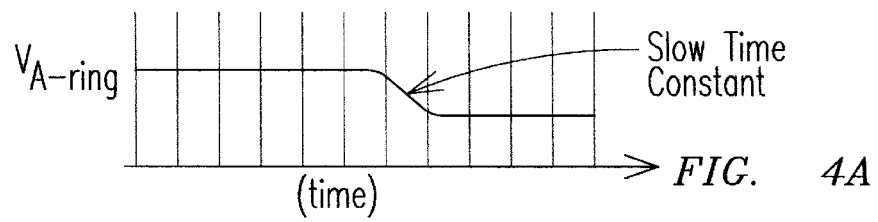
FIG. 4 illustrates respective exemplary waveforms from the circuits of FIGS. 2, and 3 that may be used for determining the connection status of the phone line.
Figure 4B:
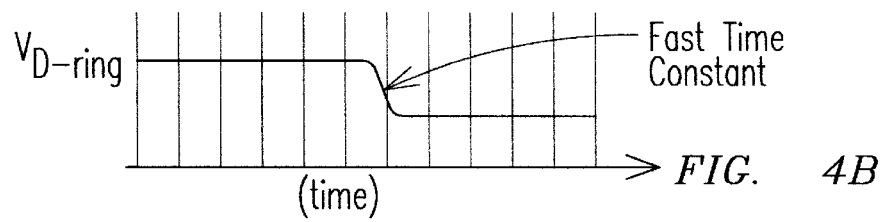
Figure 4C:
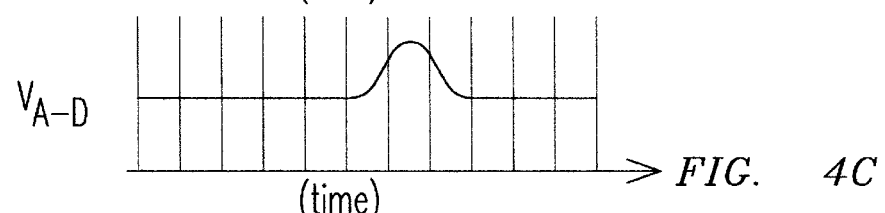
Figure 4D:
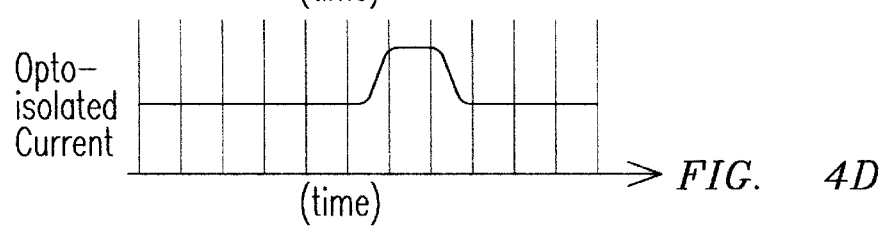

FIG. 4, made up of FIGS. 4A, 4B, 4C and 4D, illustrates exemplary waveforms in connection with the operation of circuit 26. As shown in FIG. 4A, the exemplary waveform depicted therein illustrates a signal representative of the output signal A from second transistor stage 30 that, as suggested above, has a relatively slow time response as compared to the output signal D from the first transistor stage 28, as illustrated in FIG. 4B. FIG. 4C illustrates a pulse signal that results due to the voltage difference that is developed across terminals A and D and which voltage difference is respectively supplied to an opto-coupler 44 so as to produce the waveforms shown in FIG. 4D that is used for detecting changes in the connection status of the phone line.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A circuit for determining connection status of a phone line including respective tip and ring lines, the connection status of the line corresponding to either an On-Hook condition or an Off-Hook condition, the circuit comprising:
   a first transistor stage coupled to receive a signal indicative of a voltage difference between the respective tip and ring lines, the first transistor stage configured to supply an output signal having a predetermined time response; and
   a second transistor stage coupled to the first transistor stage, the second transistor stage configured to supply an output signal having a slow time response relative to the output signal from the first transistor stage, wherein the voltage difference of the respective output signals of the first and second stages comprises a signal indicative of the connection status of the line.

2. The circuit of claim 1 wherein the first transistor stage comprises a respective transistor having respective base, collector, and emitter terminals wherein the collector terminal is coupled to the tip line, the emitter terminal is coupled to the ring line and the base terminal is coupled to receive the voltage difference across the respective tip and ring lines.

3. The circuit of claim 2 wherein the first transistor stage further comprises a voltage divider network for receiving the voltage difference across the respective tip and ring lines.

4. The circuit of claim 2 wherein the voltage divider network includes a bypass capacitor for attenuating AC signal information into the base terminal of the first transistor stage.

5. The circuit of claim 4 wherein the emitter terminal supplies the output signal from the first transistor stage.

6. The circuit of claim 4 wherein the emitter terminal of the transistor in the second transistor stage supplies the output signal from the second transistor stage.

7. The circuit of claim 6 further comprising a third transistor stage responsive to the respective output signals of the first and second transistor stages to generate a pulse signal indicative of the connection status of the phone line.

8. The circuit of claim 6 further comprising an optocoupler coupled to receive the pulse signal, the level of the pulse signal being selected to drive the optocoupler in a saturation mode of operation upon detection of a respective change in the connection status of the phone line.

9. The circuit of claim 1 wherein the second transistor stage comprises a respective transistor having respective base, collector, and emitter terminals wherein the collector terminal is coupled to the tip line, the emitter terminal is coupled to the ring line and the base terminal is coupled to the base terminal of the first transistor stage to receive the voltage difference signal across the respective tip and ring lines.

10. The circuit of claim 9 wherein the second transistor stage further comprises a lag network coupled to impart a predetermined lag to the voltage difference signal being fed into the base terminal of the second transistor stage.

11. A telecommunications device having a circuit for determining connection status of a phone line shared by that device with a phone, the phone line including respective tip and ring lines, the connection status of the line corresponding to either an On-Hook condition or an Off-Hook condition, the device comprising:
   a controller coupled to receive from the circuit a signal indicative of the connection status of the phone line and having means for initiating or interrupting a respective communication based on the indicated line connection status, and wherein the circuit in turn comprises:
      a first transistor stage coupled to receive a signal indicative of a voltage difference between the respective tip and ring lines, the first transistor stage configured to supply an output signal having a predetermined time response; and
      a second transistor stage coupled to the first transistor stage, the second transistor stage configured to supply an output signal having a slow time response relative to the output signal from the first transistor stage, wherein the voltage difference of the respective output signals of the first and second stages comprises the signal indicative of the connection status of the line.

12. The device of claim 11 comprising a modem.

13. The device of claim 11 wherein the first transistor stage comprises a respective transistor having respective base, collector, and emitter terminals wherein the collector terminal is coupled to the tip line, the emitter terminal is coupled to the ring line and the base terminal is coupled to receive the voltage difference across the respective tip and ring lines.

14. The device of claim 13 wherein the first transistor stage further comprises a voltage divider network for receiving the voltage difference across the respective tip and ring lines.

15. The device of claim 13 wherein the voltage divider network includes a bypass capacitor for attenuating AC signal information into the base terminal of the first transistor stage.

16. The device of claim 15 wherein the emitter terminal supplies the output signal from the first transistor stage.

17. The device of claim 15 wherein the emitter terminal of the transistor in the second transistor stage supplies the output signal from the second transistor stage.

18. The device of claim 17 further comprising a third transistor stage responsive to the respective output signals of the first and second transistor stages to generate a pulse signal indicative of the connection status of the phone line.

19. The device of claim 17 further comprising an optocoupler coupled to receive the pulse signal, the level of the pulse signal being selected to drive the optocoupler in a saturation mode of operation upon detection of a respective change in the connection status of the phone line.

20. The device of claim 11 wherein the second transistor stage comprises a respective transistor having respective base, collector, and emitter terminals wherein the collector terminal is coupled to the tip line, the emitter terminal is coupled to the ring line and the base terminal is coupled to the base terminal of the first transistor stage to receive the voltage difference signal across the respective tip and ring lines.

21. The device of claim 20 wherein the second transistor stage further comprises a lag network coupled to impart a predetermined lag to the voltage difference signal being fed into the base terminal of the second transistor stage.

* * * * *